(12) United States Patent
Shockley

(10) Patent No.: US 10,126,031 B2
(45) Date of Patent: Nov. 13, 2018

(54) DETECTING REFRIGERANT LEAK IN A REFRIGERATION SYSTEM

(71) Applicant: Honeywell International Inc., Morris Plains, NJ (US)

(72) Inventor: Nicholas Shockley, Fayetteville, AR (US)

(73) Assignee: Honeywell International Inc., Morris Plains, NJ (US)

( * ) Notice: Subject to any disclaimer, the term of this patent is extended or adjusted under 35 U.S.C. 154(b) by 158 days.

(21) Appl. No.: 15/211,454

(22) Filed: Jul. 15, 2016

(65) Prior Publication Data

US 2018/0017299 A1   Jan. 18, 2018

(51) Int. Cl.
*F25B 49/00*   (2006.01)
*G01M 3/28*   (2006.01)

(52) U.S. Cl.
CPC .......... *F25B 49/005* (2013.01); *G01M 3/2807* (2013.01); *F25B 2400/22* (2013.01); *F25B 2500/222* (2013.01); *F25B 2700/04* (2013.01)

(58) Field of Classification Search
CPC ....... G01M 3/28; G01M 3/2807; F25B 49/00; F25B 49/005; F25B 2400/22; F25B 2500/222; F25B 2700/04
See application file for complete search history.

(56) References Cited

U.S. PATENT DOCUMENTS

| 8,967,191 | B1 | 3/2015 | DeVerse et al. |
| 2011/0000234 | A1* | 1/2011 | Nishimura ............ F25B 49/005 62/77 |
| 2013/0327071 | A1* | 12/2013 | Doughty ............. G01M 3/3245 62/114 |

FOREIGN PATENT DOCUMENTS

| EP | 1535123 B1 | 10/2007 | |
| JP | H1194408 A | 4/1999 | |
| JP | 2010190545 A * | 9/2010 | ............. F25B 49/02 |
| WO | 88004031 A1 | 6/1988 | |

* cited by examiner

*Primary Examiner* — Nguyen Ha
(74) *Attorney, Agent, or Firm* — Brooks, Cameron & Huebsch, PLLC

(57) ABSTRACT

Devices, methods, and systems for detecting refrigerant leak in a refrigeration system are described herein. One device includes a memory and a processor configured to execute executable instructions stored in the memory to detect fluctuations in a refrigerant level in a refrigerant tank of a refrigeration system, determine whether the detected fluctuations in the refrigerant level are abnormal, and determine whether a refrigerant leak is occurring in the refrigeration system based, at least in part, on whether the detected fluctuations in the refrigerant level are abnormal.

18 Claims, 2 Drawing Sheets

DETECTING REFRIGERANT LEAK IN A REFRIGERATION SYSTEM

TECHNICAL FIELD

The present disclosure relates to devices, methods, and systems for detecting refrigerant leak in a refrigeration system.

BACKGROUND

A refrigeration system in a retail store, such as, for instance, a supermarket or grocery store, may include a large number of refrigeration circuits, such as, for instance, refrigeration and freezer display cases and walk-in coolers. A refrigeration system may also include one or more rooms, commonly referred to as refrigeration racks, which may contain compressors, fans, refrigerant tanks, and/or associated control circuitry, to centrally manage the temperature of the refrigeration circuits (e.g., keep the refrigeration circuits at the correct temperature). For example, the refrigeration system may use refrigerant held in the refrigerant tanks to transfer heat from one location to another in the refrigeration system.

A refrigerant leak may occur in a refrigeration system at some point during operation of the system. If the refrigerant leak is not quickly detected, an unplanned loss of refrigerant will occur, which may result in a refrigeration rack failure and/or emergency situation in the retail store.

DETAILED DESCRIPTION

Figure 1:
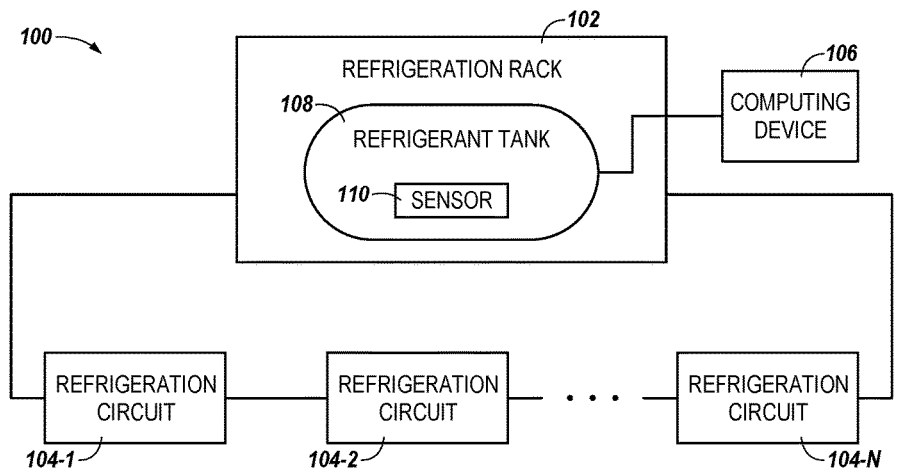
FIG. 1 illustrates an example of a refrigeration system in accordance with one or more embodiments of the present disclosure.

Devices, methods, and systems for detecting refrigerant leak in a refrigeration system are described herein. For example, one or more embodiments include a memory and a processor configured to execute executable instructions stored in the memory to detect fluctuations in a refrigerant level in a refrigerant tank of a refrigeration system, determine whether the detected fluctuations in the refrigerant level are abnormal, and determine whether a refrigerant leak is occurring in the refrigeration system based, at least in part, on whether the detected fluctuations in the refrigerant level are abnormal.

Embodiments of the present disclosure can quickly and accurately detect a refrigerant leak occurring in a refrigeration system. For example, embodiments of the present disclosure can effectively predict when a refrigerant leak has occurred.

Further, embodiments of the present disclosure can detect (e.g., predict) a refrigerant leak in a refrigeration system without using a separate (e.g., additional) leak detection sensor, such as an infrared (IR) sensor to detect refrigerant in the air of the system, which may be costly and/or add to the size and/or complexity of the refrigeration system. Rather, embodiments of the present disclosure can detect refrigerant leaks in a refrigeration system using existing sensors in the refrigerant tanks of the refrigeration system in combination with an analytical model, which may reduce the cost, size, and/or complexity of the refrigeration system.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a" or "a number of" something can refer to one or more such things. For example, "a number of refrigeration circuits" can refer to one or more refrigeration circuits. Additionally, the designator "N" as used herein, particularly with respect to reference numerals in the drawings, indicates that a number of the particular feature so designated can be included with embodiments of the present disclosure.

FIG. 1 illustrates an example of a refrigeration system 100 in accordance with one or more embodiments of the present disclosure. Refrigeration system 100 can be a refrigeration system of, for example, a retail store, such as a supermarket or grocery store.

As shown in FIG. 1, refrigeration system 100 can include a refrigeration rack 102 and a number of refrigeration circuits 104-1, 104-2, . . . , 104-N in a closed loop system. Refrigeration circuits 104-1, 104-2, . . . , 104-N can be, for example, refrigeration and/or freezer display cases and/or walk-in coolers of the retail store. For instance, a refrigeration circuit may include a single display case or walk-in cooler, or multiple display cases or walk-in coolers.

Refrigeration rack 102 may refer to a room, or a portion of a room, of the retail store that includes components and/or equipment for centrally managing the temperature of refrigeration circuits 104-1, 104-2, . . . , 104-N (e.g., keeping the refrigeration circuits at the correct temperature). For example, as shown in FIG. 1, refrigeration rack 102 can include a refrigerant tank 108. Refrigerant tank 108 can include (e.g., hold) refrigerant that can be used to transfer heat from one location to another during operation of refrigeration system 100.

Although not shown in FIG. 1 for clarity and so as not to obscure embodiments of the present disclosure, refrigeration rack 102 can also include other components and/or equipment, such as, for instance, compressors, evaporators, condensers, and fans used during operation of refrigeration system 100. Further, although one refrigeration rack and refrigerant tank are illustrated in FIG. 1, embodiments of the present disclosure are not so limited (e.g., refrigeration system 100 can include any number of refrigeration racks and/or refrigerant tanks).

As shown in FIG. 1, refrigerant tank 108 can include a sensor 110. Sensor 110 can be, for example, a float switch or an analog level sensor. Further, sensor 110 can be an existing sensor in refrigerant tank 108.

Sensor 110 can sense whether the refrigerant level (e.g., the level of the refrigerant) in refrigerant tank 108 is above or below a particular level. For example, sensor 110 may trigger on and off depending on the level of the refrigerant in refrigerant tank 108. For instance, sensor 110 may trigger on when the refrigerant level in tank 108 moves above a first level, and sensor 110 may trigger off when the refrigerant level in tank 108 moves below a second level, which may or may not be the same level as the first level.

As shown in FIG. 1, refrigeration system 100 can include a computing device 106. Computing device 106 can be, for example, a laptop computer, desktop computer, or mobile device (e.g., smart phone, tablet, PDA, etc.), among other types of computing devices.

In the example illustrated in FIG. 1, computing device 106 can be a controller of refrigeration system 100. For example, computing device 106 can be the central controller of refrigeration system 100 that controls the components and/or equipment of refrigeration rack 102 and manages the temperature of refrigeration circuits 104-1, 104-2, . . . , 104-N. For instance, in the example illustrated in FIG. 1, computing device 106 is directly coupled to the components and/or equipment of refrigeration rack 102 (e.g., refrigerant tank 108). That is, in the example illustrated in FIG. 1, computing device 106 is in direct communication with the components and/or equipment of refrigeration rack 102 (e.g., refrigerant tank 108) via a direct wired or wireless connection, and may be located on-site (e.g., at the retail store). Further, although computing device 106 is illustrated as being located outside of refrigeration rack 102 in FIG. 1, in some embodiments computing device 106 may be located in refrigeration rack 102.

Computing device 106 can detect (e.g., predict) refrigerant leaks in refrigeration system 100 using information received from refrigerant tank 108, such as, for instance, data sensed by sensor 110 indicating whether the refrigerant in refrigerant tank 108 is above or below a particular level. For example, computing device 106 can detect refrigerant leaks in refrigeration system 100 based on when, and/or how often, sensor 110 triggers on and/or off to indicate that the refrigerant level in refrigerant tank 108 has moved above or below a particular level.

For example, computing device 106 can detect fluctuations in the refrigerant level in refrigerant tank 108 based, at least in part, on whether the refrigerant level is sensed by sensor 110 to be above or below a particular level in tank 108. For instance, computing device 106 can detect fluctuations in the refrigerant level in refrigerant tank 108 based on when, and/or how often, sensor 110 triggers on and off to indicate that the refrigerant level has moved above or below a particular level. As an example, a first fluctuation may be detected based on the refrigerant level being sensed to be above a particular level (e.g., based on sensor 110 triggering on), and a second, subsequent fluctuation may be detected based on the refrigerant level subsequently being sensed to be below the particular level (e.g., based on sensor 110 triggering off).

Computing device 106 can then determine whether the detected fluctuations in the refrigerant level in refrigerant tank 108 are abnormal (e.g., unexpected). For instance, computing device 106 can determine whether the detected fluctuations are abnormal for the current operating conditions of refrigeration system 100. That is, whether a fluctuation is determined to be abnormal may depend on the current operating conditions of refrigeration system 100. For example, the detected fluctuations may be abnormal for the current operating conditions of refrigeration system 100 if the detected fluctuations are outside of an expected (e.g., normal) fluctuation range for the current operating conditions, and the detected fluctuations may not be abnormal for the current operating conditions of refrigeration system 100 if the detected fluctuations are not outside (e.g., are within) the expected fluctuation range for the current operating conditions.

The current operating conditions of refrigeration system 100 can include, for example, the current weather and/or environmental conditions of refrigeration system 100, such as the current ambient temperature of refrigeration system 100. The current operating conditions may also include the current status of the condenser(s) of refrigeration system 100 (e.g., whether the condenser(s) is in full or split mode), the current status of the hold back valve(s) of the condenser(s) of system 100 (e.g., whether hold back valve(s) of the condenser(s) is open or modulating), and/or the current cooling cycle status of refrigeration system 100 (e.g., whether the cooling cycle is on or off).

Computing device 106 can determine whether the detected fluctuations in the refrigerant level in refrigerant tank 108 are abnormal (e.g., whether the detected fluctuations are outside of the expected fluctuation range) using a refrigerant level fluctuation model for refrigeration system 100. For example, computing device 106 can compare the detected fluctuations in the refrigerant level, and/or the amount of time between the detected fluctuations, to the refrigerant level fluctuation model, and determine whether the detected fluctuations are abnormal based on the comparison. For instance, the detected fluctuations may be abnormal if they deviate from the model by more than a particular amount, and the detected fluctuations may not be abnormal if they do not deviate from the model by more than the particular amount (e.g., if they deviate from the model by less than the particular amount).

The refrigerant level fluctuation model can be a model of how the refrigerant level in refrigerant tank 108 is expected to fluctuate under different operating conditions for refrigeration system 100. As such, the refrigerant level fluctuation model can be used (e.g., by computing device 106) to take the current operating conditions of refrigeration system 100 into account when determining whether the detected fluctuations in the refrigerant level in tank 108 are abnormal.

The refrigerant level fluctuation model can be determined (e.g., developed) based, at least in part, on fluctuations in the refrigerant level in refrigerant tank 108 under historical operating conditions. For example, the refrigerant level fluctuation model can be determined based on when, and/or how often, sensor 110 triggers on and off under historical operating conditions. In some embodiments, the refrigerant level fluctuation model can be a static, pre-determined (e.g., pre-loaded) model.

Computing device 106 can then determine whether a refrigerant leak is occurring in refrigeration system 100 based, at least in part, on whether the detected fluctuations in the refrigerant level in refrigerant tank 108 are abnormal. For instance, computing device 106 can determine whether a refrigerant leak is occurring in system 100 based on whether the comparison of the detected fluctuations in the refrigerant level, and/or the amount of time between the detected fluctuations, to the refrigerant level fluctuation model indicates the detected fluctuations are abnormal. For example, a refrigerant leak may be occurring in refrigeration system 100 if the detected fluctuations in the refrigerant level are determined to be abnormal (e.g., if the comparison indicates the detected fluctuations are abnormal), and a refrigerant leak may not be occurring if the detected fluctuations are determined to not be abnormal (e.g., if the comparison indicates the detected fluctuations are not abnormal).

As such, computing device 106 can determine whether a refrigerant leak is occurring in refrigeration system 100 without using a separate (e.g., additional) leak detection sensor, such as an infrared (IR) sensor, to detect refrigerant in the air of the system. Rather, computing device 106 can use the information received from refrigerant tank 108 (e.g., the data sensed by sensor 110) indicating whether the refrigerant in refrigerant tank 108 is above or below a particular level, in combination with the refrigerant level fluctuation model, to determine whether a refrigerant leak is occurring in system 100.

Upon determining a refrigerant leak is occurring in refrigeration system 100, computing device 106 can generate a notification of the leak, and transmit the notification to the appropriate people and/or operators for corrective action. For example, the notification can be routed to personnel of the retail store to implement emergency food procedures, maintenance technicians to address and fix the leak, and/or an operations center for monitoring of the leak. In some embodiments, the notification can be generated and/or transmitted automatically upon the leak being determined to have occurred.

Figure 2:
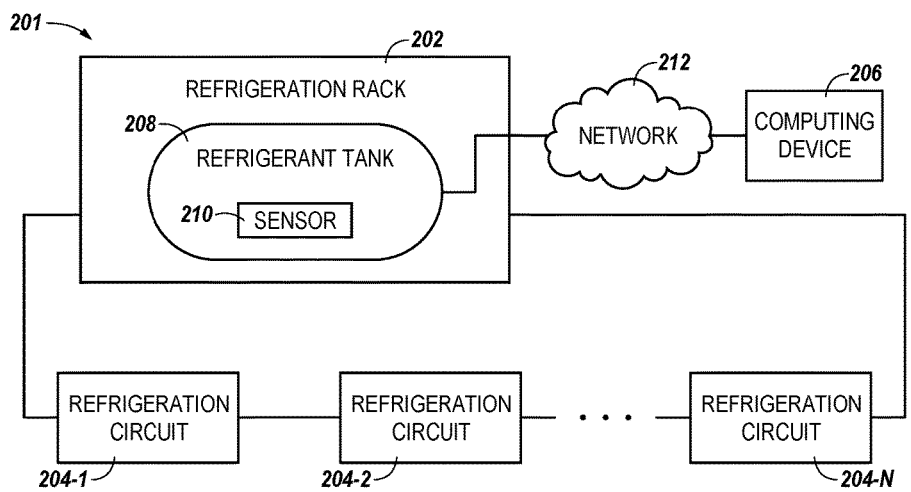
FIG. 2 illustrates an additional example of a refrigeration system in accordance with one or more embodiments of the present disclosure.

FIG. 2 illustrates an additional example of a refrigeration system 201 in accordance with one or more embodiments of the present disclosure. Refrigeration system 201 can be a refrigeration system of, for example, a retail store, such as a supermarket or grocery store, in a manner analogous to refrigeration system 100 previously described in connection with FIG. 1.

As shown in FIG. 2, refrigeration system 201 can include a refrigeration rack 202 and a number of refrigeration circuits 204-1, 204-2, . . . , 204-N in a closed loop system. Refrigeration rack 202 and refrigeration circuits 204-1, 204-2, . . . , 204-N can be analogous to refrigeration rack 102 and refrigeration circuits 104-1, 104-2, . . . , 104-N, respectively, previously described in connection with FIG. 1.

As shown in FIG. 2, refrigeration rack 202 can include a refrigerant tank 208, which can include a sensor 210. Refrigerant tank 208 and sensor 210 can be analogous to refrigerant tank 108 and sensor 210, respectively, previously described in connection with FIG. 1.

As shown in FIG. 2, refrigeration system 201 can include a computing device 206. Computing device 206 can be, for example, a laptop computer, desktop computer, or mobile device (e.g., smart phone, tablet, PDA, etc.), among other types of computing devices.

In the example illustrated in FIG. 2, computing device 206 and the components and/or equipment of refrigeration rack 202 (e.g., refrigerant tank 208) can be coupled (e.g., communicate) via a network 212, as shown in FIG. 2. For instance, computing device 206 may be located off-site from the retail store and/or remote to (e.g., located remotely from) the components and/or equipment of refrigeration rack 202 (e.g., refrigerant tank 208).

Network 212 can be a network relationship of refrigeration system 201 through which computing device 206 and the components and/or equipment of refrigeration rack 202 (e.g., refrigerant tank 208) can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of networks.

As used herein, a "network" (e.g., network 212) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 212 can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Computing device 206 can detect (e.g., predict) refrigerant leaks in refrigeration system 201 using information received from refrigerant tank 208, such as, for instance, data sensed by sensor 210 indicating whether the refrigerant in refrigerant tank 208 is above or below a particular level, in a manner analogous to that previously described in connection with FIG. 1. For example, computing device 206 can detect refrigerant leaks in refrigeration system 201 based on when, and/or how often, sensor 210 triggers on and/or off to indicate that the refrigerant level in refrigerant tank 208 has moved above or below a particular level, in a manner analogous to that previously described in connection with FIG. 1.

As such, computing device 206 can determine whether a refrigerant leak is occurring in refrigeration system 201 without using a separate leak detection sensor to detect refrigerant in the air of the system, in a manner analogous to that previously described in connection with FIG. 1. Further, upon determining a refrigerant leak is occurring in refrigeration system 201, computing device 206 can generate a notification of the leak, and transmit the notification to the appropriate people and/or operators for corrective action, in a manner analogous to that previously described in connection with FIG. 1.

Figure 3:
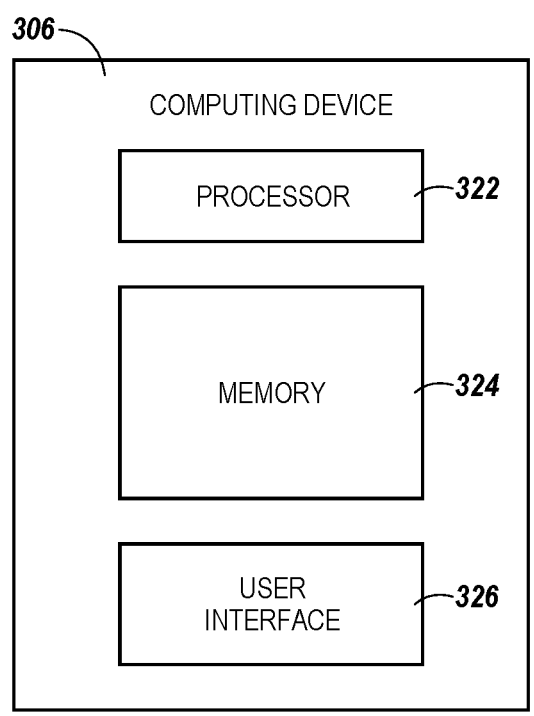
FIG. 3 illustrates a computing device for detecting refrigerant leak in a refrigeration system in accordance with one or more embodiments of the present disclosure.

FIG. 3 illustrates a computing device 306 for detecting refrigerant leak in a refrigeration system in accordance with one or more embodiments of the present disclosure. Computing device 306 can be, for example, computing device 106 and/or 206 previously described in connection with FIGS. 1 and 2, respectively. For instance, computing device 306 can detect (e.g., predict) refrigerant leaks in refrigeration systems 100 and/or 201 previously described in connection with FIGS. 1 and 2, respectively.

As shown in FIG. 3, computing device 306 can include a memory 324 and a processor 322. Memory 324 can be any type of storage medium that can be accessed by processor 322 to perform various examples of the present disclosure. For example, memory 324 can be a non-transitory computer readable medium having computer readable instructions (e.g., computer program instructions) stored thereon that are executable by processor 322 to detect refrigerant leak in a refrigeration system in accordance with the present disclosure. That is, processor 322 can execute the executable instructions stored in memory 324 to detect refrigerant leak in a refrigeration system in accordance with the present disclosure.

Memory 324 can be volatile or nonvolatile memory. Memory 324 can also be removable (e.g., portable) memory, or non-removable (e.g., internal) memory. For example, memory 324 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 324 is illustrated as being located in computing device 306, embodiments of the present disclosure are not so limited. For example, memory 324 can also be located internal to another computing resource (e.g., enabling computer readable instructions to be downloaded over the Internet or another wired or wireless connection).

As shown in FIG. 3, computing device 306 can include a user interface 326. A user (e.g., operator) of computing device 306 can interact with computing device 306 via user interface 326. For example, user interface 326 can provide (e.g., display and/or present) information to the user of computing device 100, such as, for instance, a notification that a refrigerant leak has been detected in a refrigeration system in accordance with the present disclosure. Further, user interface 106 can receive information from (e.g., input by) the user of computing device 100.

In some embodiments, user interface 326 can be a graphical user interface (GUI) that can include a display (e.g., a screen) that can provide and/or receive information to and/or from the user of computing device 306. The display can be, for instance, a touch-screen (e.g., the GUI can include touch-screen capabilities). As an additional example, user interface 326 can include a keyboard and/or mouse the user can use to input information into computing device 306. Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for detecting refrigerant leak in a refrigeration system, comprising:
   a memory; and
   a processor configured to execute executable instructions stored in the memory to:
      detect fluctuations in a refrigerant level in a refrigerant tank of a refrigeration system;
      determine whether the detected fluctuations in the refrigerant level are abnormal based, at least in part, on an amount of time between the fluctuations; and
      determine whether a refrigerant leak is occurring in the refrigeration system based, at least in part, on whether the detected fluctuations in the refrigerant level are abnormal.

2. The computing device of claim 1, wherein the processor is configured to execute the instructions to determine whether the detected fluctuations in the refrigerant level are abnormal using a refrigerant level fluctuation model for the refrigeration system.

3. The computing device of claim 1, wherein the processor is configured to detect fluctuations in the refrigerant level in the refrigerant tank based, at least in part, on whether the refrigerant level is above or below a particular level in the refrigerant tank.

4. The computing device of claim 1, wherein the processor is configured to execute the instructions to determine whether the detected fluctuations in the refrigerant level are abnormal for current operating conditions of the refrigeration system.

5. The computing device of claim 4, wherein:
   the detected fluctuations in the refrigerant level are abnormal for the current operating conditions of the refrigeration system if the detected fluctuations are outside an expected fluctuation range for the current operating conditions; and
   the detected fluctuations in the refrigerant level are not abnormal for the current operating conditions of the refrigeration system if the detected fluctuations are not outside the expected fluctuation range for the current operating conditions.

6. The computing device of claim 4, wherein the current operating conditions of the refrigeration system include a current ambient temperature of the refrigeration system.

7. The computing device of claim 4, wherein the current operating conditions of the refrigeration system include a current status of a condenser of the refrigeration system.

8. The computing device of claim 4, wherein the current operating conditions of the refrigeration system include a current status of a hold back valve of a condenser of the refrigeration system.

9. The computing device of claim 4, wherein the current operating conditions of the refrigeration system include a current cooling cycle status of the refrigeration system.

10. A method for detecting refrigerant leak in a refrigeration system, comprising:
   detecting, by a computing device, fluctuations in a refrigerant level in a refrigerant tank of a refrigeration system;

determining a refrigerant level fluctuation model for the refrigeration system based, at least in part, on fluctuations in the refrigerant level in the refrigerant tank under historical operating conditions;

comparing, by the computing device, the detected fluctuations in the refrigerant level to the refrigerant level fluctuation model; and determining whether a refrigerant leak is occurring in the refrigeration system based, at least in part, on the comparison of the detected fluctuations in the refrigerant level to the refrigerant level fluctuation model.

11. The method of claim 10, wherein:

a refrigerant leak is occurring in the refrigeration system if the comparison of the detected fluctuations in the refrigerant level to the refrigerant level fluctuation model indicates the detected fluctuations are abnormal; and a refrigerant leak is not occurring in the refrigeration system if the comparison of the detected fluctuations in the refrigerant level to the refrigerant level fluctuation model indicates the detected fluctuations are not abnormal.

12. The method of claim 10, wherein the method includes determining whether a refrigerant leak is occurring in the refrigeration system without using a leak detection sensor.

13. The method of claim 10, wherein the refrigerant level fluctuation model is a model of how the refrigerant level in the refrigerant tank is expected to fluctuate under different operating conditions for the refrigeration system.

14. A refrigeration system, comprising a refrigerant tank, wherein the refrigerant tank includes a sensor configured to sense whether a refrigerant level in the refrigerant tank is above or below a particular level; and a computing device configured to:

detect fluctuations in the refrigerant level in the refrigerant tank based, at least in part, on whether the refrigerant level is sensed to be above or below the particular level by the sensor;

determine whether the detected fluctuations in the refrigerant level are abnormal for current operating conditions of the refrigeration system, wherein the current operating conditions of the refrigeration system include:

a current status of a hold back valve of a condenser of the refrigeration system; or a current cooling cycle status of the refrigeration system; and determine whether a refrigerant leak is occurring in the refrigeration system based, at least in part, on whether the detected fluctuations in the refrigerant level are abnormal.

15. The refrigeration system of claim 14, wherein the sensor is a float switch or an analog level sensor.

16. The refrigeration system of claim 14, wherein the computing device is a controller of the refrigeration system.

17. The refrigeration system of claim 14, wherein the refrigerant tank and the computing device are configured to communicate via a cloud computing environment.

18. The refrigeration system of claim 14, wherein the computing device is configured to generate a notification upon determining a refrigerant leak is occurring in the refrigeration system.

* * * * *